United States Patent Office 3,418,037
Patented Dec. 24, 1968

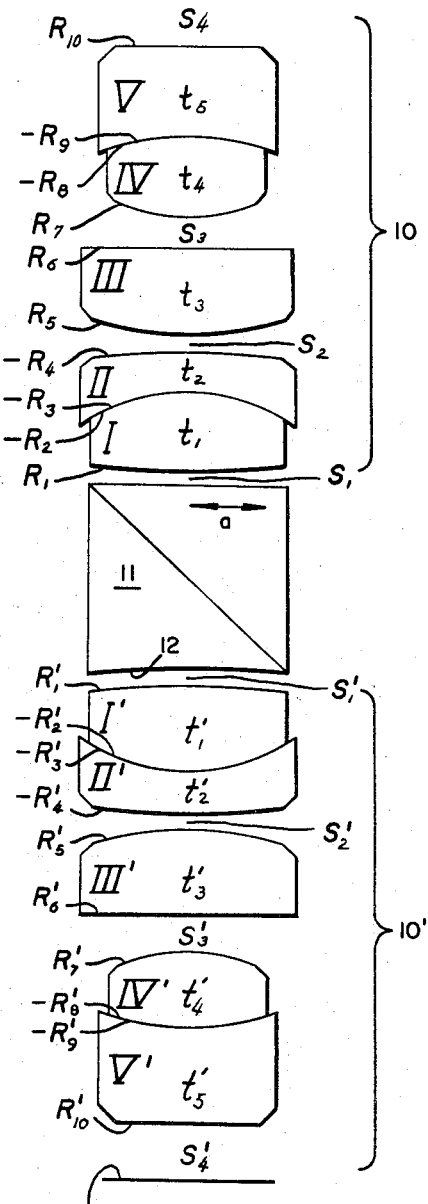

3,418,037
OPTICAL SYSTEM FOR ANGULAR MEASURING INSTRUMENTS
Brian H. Welham, Rochester, N.Y., assignor to Bausch & Lomb Incorporated, Rochester, N.Y., a corporation of New York
Filed July 2, 1964, Ser. No. 379,991
1 Claim. (Cl. 350—202)

ABSTRACT OF THE DISCLOSURE

An optical angular measurement instrument having two substantially similar optical objectives having one of their conjugates at infinity and being placed back-to-back in optical alignment with and between a confronting measuring scale and a reticle surface, a beam dividing cube being located between the adjacent inner ends of said objectives whereby light may be projected onto said surfaces and observation of the superimposed images formed by said objectives may be provided.

---

This invention relates to a novel optical system and more particularly to a unit magnification system which includes compensating means for use in angular measuring instruments or the like.

Angular measuring instruments of the type having circular rulings and means sensing the positions of those rulings have recently been developed. The recently developed instruments have the potential to detect rotational movement of extremely small magnitudes. Such devices should detect angular milliseconds when properly equipped with precision optical systems. For example, the devices which are disclosed and claimed in the copending application of Kreckel et al. S.N. 275,540 filed Apr. 25, 1963, now abandoned, and assigned to the same assignee as the present invention are designed to detect and indicate minute rotational displacements. Accordingly, they have created a demand for a precision optical system.

Measuring systems such as those disclosed in the aforementioned application include an imaging system for superimposing an image of a reticle and a scale, so that, an angular displacement of a portion of a cycle (a cycle being one transparent and one opaque area) progressing from one reticle to another may be accurately measured. The imaging means for optical imaging areas of the scale or to image different ones of the reticles onto different portions of the scale to thereby regulate the light intensity are utilized in those systems.

The optical systems disclosed and claimed herein represent an improvement on the systems called for in the copending application of J. Schwartz, entitled, "Optical Systems," Ser. No. 379,992 filed concurrently herewith, now Patent No. 3,370,903 and assigned to the same assignee as the present application. Both systems have been designed particularly for the requirements of the angular measuring instruments disclosed and claimed in the aforementioned Kreckel et al. application. The particular problems relating to those devices have been overcome to a relatively high degree by the systems disclosed and claimed herein. For example, the lens systems image each of eight areas of a scale onto each of eight reticles at unit magnification. The spacings between the scale divisions are relatively small i.e. in the range of two seconds of arc and interpolation to 100 seconds of arc for a 500 millimeter diameter circular scale are obtainable with the present optical system.

Advantageously, two sets of lines are imaged on each other by two objectives having collimated light between them in a manner which permits observation of the superposition. A beam splitter is so constructed and arranged that lateral movement of the beam splitter produces minified displacement of the image of one set of lines with respect to the other to thereby provide means for accurately changing and/or measuring any misalignment of the line sets.

Briefly, the present invention comprises an improvement in an optical system of the type having a pair of objectives placed back to back with their long conjugates at infinity. The separation of the objectives is such that they are separated by a distance equal to twice the exit pupil distance from the lens vertex nearest to the long conjugate. A beam splitter prism is inserted between the two objectives. Each of the objectives include the following axially aligned elements I through V. Elements I through V are numbered from the prism 11 rearwardly in objective 10 and elements I′ through V′ are the corresponding numbers in objective 10′. The element I defines a double convex lens having the longer radius on the side of the prism. A second element II comprises a concavo-convex lens element with the concave surface having a radius which matches the shorter radius of the element I and is cemented thereto to form a compound lens. A plano convex singlet makes up the element III and it is airspaced from the doublet I–II and the doublet IV, V. The doublet IV, V includes a double convex lens IV with its shortest radius closest to the prism. The element V defines a plano concave lens wherein the radius of the concave surface matches the rear convex surface of the element IV.

The improvement comprises a beam splitter 11 including a surface 12 defining a slight power. The power defining surface being concave toward objective 10′ and being disposed normal to the collimated beam so that lateral movement of the beam splitter in the direction of double headed arrow $a$ will produce minified displacement of the image of one set of lines with respect to the other to thereby provide means for accurately changing and/or measuring the original misalignment of the line sets.

The lens systems according to the present invention will now be described in connection with the accompanying drawing, in which:

The single figure of the drawing is an axial section through a lens system according to the present invention.

The lens system shown in the drawing comprises a pair of objective lenses 10 and 10′ and a beam splitter 11 separating the two objectives. The objectives are disposed in a back to back relationship with their long conjugates at infinity. Minimum aberrations were maintained in the systems by constructing each of the two objectives including the elements I through V and I′ through V′ respectively in accordance with the constructional data shown in Table A.

TABLE A $45.00 < R_1', R_1 < 55.00$
$8.01 < -R_2', R_2 < 9.79$
$8.01 < -R_3', R_3 < 9.79$
$28.90 < -R_4', R_4 < 35.32$
$13.32 < R_5', R_5 < 16.28$
$R_6', R_6 = \infty$
$7.65 < R_7', R_7 < 9.35$
$11.49 < -R_8', R_8 < 14.05$
$11.49 < -R_9', R_9 < 14.05$
$R_{10}', R_{10} = \infty$
$3.55 < t_1', t_1 < 4.33$
$1.77 < t_2', t_2 < 2.17$
$3.51 < t_3', t_3 < 4.29$
$3.39 < t_4', t_4 < 4.15$
$3.67 < t_5', t_5 < 4.49$
$0.270 < S_1', S_1 < 0.330$
$0.576 < S_2', S_2 < 0.704$
$1.503 < S_3', S_3 < 1.837$
$2.394 < S_4', S_4 < 2.926$ wherein $R_1$ to $R_{10}$ and $R_1'$ to $R_{10}'$ are the radii of the lens surfaces, $t_1$ to $t_5$ and $t_1'$ to $t_5'$ are the axial thicknesses, and $S_1$ to $S_4$ and $S_1'$ to $S_4'$ are the axial spacings, the minus (—) sign used with certain R designations denoting that such a lens surface is concave toward the beam splitter.

The two objectives are airspaced from each other by a distance of between 8.4 and 9.9 mm. A beam splitter of between 8.1 and 9.6 mm. is disposed between the objectives.

It is also desirable to construct the lens system in accordance with the constructional data set forth in Table B.

TABLE B $1.5170 < n_1 < 1.5190$
$1.7100 < n_2 < 1.7300$
$1.5790 < n_3 < 1.5990$
$1.5630 < n_4 < 1.5830$
$1.5650 < n_5 < 1.5850$
$54.6 < \nu_1 < 64.6$
$24.3 < \nu_2 < 34.3$
$56.2 < \nu_3 < 66.2$
$52.4 < \nu_4 < 62.4$
$36.4 < \nu_5 < 46.4$ wherein $n_1$ to $n_5$ are the indices of refraction and $\nu_1$ to $\nu_5$ are the Abbe numbers, of the elements I through V and I' through V' respectively.

The two objectives 10 and 10' according to a preferred embodiment of the invention are separated by a distance of 9.6 mm. and a beam splitter prism 11 which is 9 mm. square and is disposed in the airspace which separates the objectives 10 and 10'. The objectives according to the preferred embodiment conform to the following constructional data shown in Table C, the designations for the objective 10' being distinguished by a (').

wherein $R_1$ to $R_1'$ and $R_{10}'$ are the radii of the lens surfaces, $t_1$ to $t_5$ and $t_1'$ to $t_5'$ are the axial thicknesses, $S_1$ to $S_4$ and $S_1'$ to $S_4'$ are the axial spacings, $n1$ to $n$ are the indices of refraction and $\nu_1$ to $\nu_5$ are the Abbe numbers of the elements I through V for the objectives 10 and 10' and I' through V' respectively.

The beam splitter 11 is preferably about 9 mm. square and within the range of 8.1 mm. to 9.9 mm. on each edge and has an index of refraction of between 1.5675 and 1.5775 mm. One surface 12 of the prism 11 which is normal to the collimated light from a light source L, not shown, defines a slight power. The concave surface faces the adjacent objective and has a radii of between 1023 and 1251 mm. The preferred embodiment has a radius of curvature of 1137.6 mm. and an index of refraction of 1.5725.

While the invention has been described with respect to a specific application it should be understood that it may be modified or embodied in other forms without departing from the scope of the appended claim.

What is claimed is:

1. In an optical angular measurement instrument of the type having a pair of similar objectives disposed in a back to back relationship with their long conjugates at infinity and a single beam splitter cube disposed between said objectives, each of said objectives including five elements I through V respectively, a first element I defining a double convex lens having the longer radius on the side of the prism, a second element II comprising a concavo convex lens having a radius equal to the adjacent radius of element I and in contact therewith, a plano convex singlet III airspaced from the element II, and a doublet including elements IV and V airspaced from the singlet III, the doublet IV, V including a double convex lens IV having its shortest radius closest to the prism, the element V defining a plano concave lens, each of said elements I through V conforming substantially to the following constructional data:

TABLE C

| Element | Radius | Thickness or Spacing | Index of Refraction, $n_D$ | Abbe Number, $\nu$ |
|---|---|---|---|---|
| I, I' | $R_1', R_1 = 50.00$ | $S_1', S_1 = .3$ | $n_1 = 1.5180$ | $\nu_1 = 59.6$ |
|  |  | $t_1', t_1 = 3.94$ |  |  |
|  | $-R_2', -R_2 = 8.90$ |  |  |  |
| II, II' | $-R_3', -R_3 = 8.90$ | $t_2', t_2 = 1.97$ | $n_2 = 1.7200$ | $\nu_2 = 29.3$ |
|  | $-R_4', -R_4 = 32.11$ | $S_2', S_2 = 0.64$ |  |  |
| III, III' | $R_5', R_5 = 14.80$ | $t_3', t_3 = 3.90$ | $n_3 = 1.5890$ | $\nu_3 = 61.2$ |
|  | $R_6', R_6 = $ Plano | $S_3', S_3 = 1.67$ |  |  |
| IV, IV' | $R_7', R_7 = 8.50$ | $t_4', t_4 = 3.77$ | $n_4 = 1.5730$ | $\nu_4 = 57.4$ |
|  | $-R_8', -R_8 = 12.77$ |  |  |  |
| V, V' | $-R_9', -R_9 = 12.77$ | $t_5', t_5 = 4.08$ | $n_5 = 1.5750$ | $\nu_5 = 41.4$ |
|  | $R_{10}', R_{10} = $ Plano | $S_4', S_4 = 2.66$ |  |  |

| Element | Radius | Thickness or Spacing | Index of Refraction, $n_D$ | Abbe Number, $\nu$ |
|---|---|---|---|---|
| I, I' | $R_1', R_1 = 50.00$ | $S_1', S_1 = .3$ | $n_1 = 1.5180$ | $\nu_1 = 59.6$ |
|  |  | $t_1', t_1 = 3.94$ |  |  |
|  | $-R_2', -R_2 = 8.90$ |  |  |  |
|  | $-R_3', -R_3 = 8.90$ |  |  |  |
| II, II' | $-R_4', -R_4 = 32.11$ | $t_2', t_2 = 1.97$ | $n_2 = 1.7200$ | $\nu_2 = 29.3$ |
|  |  | $S_2', S_2 = 0.64$ |  |  |
| III, III' | $R_5', R_5 = 14.80$ | $t_3', t_3 = 3.90$ | $n_3 = 1.5890$ | $\nu_3 = 61.2$ |
|  | $R_6', R_6 = $ Plano | $S_3', S_3 = 1.67$ |  |  |
| IV, IV' | $R_7', R_7 = 8.50$ | $t_4', t_4 = 3.77$ | $n_4 = 1.5730$ | $\nu_4 = 57.4$ |
|  | $-R_8', -R_8 = 12.77$ |  |  |  |
| V, V' | $-R_9', -R_9 = 12.77$ | $t_5', t_5 = 4.08$ | $n_5 = 1.5750$ | $\nu_5 = 41.4$ |
|  | $R_{10}', R_{10} = $ Plano | $S_4', S_4 = 2.66$ |  |  | the improvement comprising said beam splitter cube having a refractive surface defining a curvature of 1137.6 mm. in a plane normal to the axis of said objectives, and having an index of refraction of 1.5725, the cube being movable laterally of said axis to produce a displacement of the image formed by said objectives.

References Cited

UNITED STATES PATENTS 3,254,227   5/1966   Hock _____ 350—247

JOHN K. CORBIN, *Primary Examiner.*

U.S. Cl. X.R.

88—14; 350—214, 247